Dec. 7, 1943. B. J. OLIVER 2,335,957
ADJUSTABLE THUMB TACK OR OTHER FASTENER
Filed Oct. 21, 1942
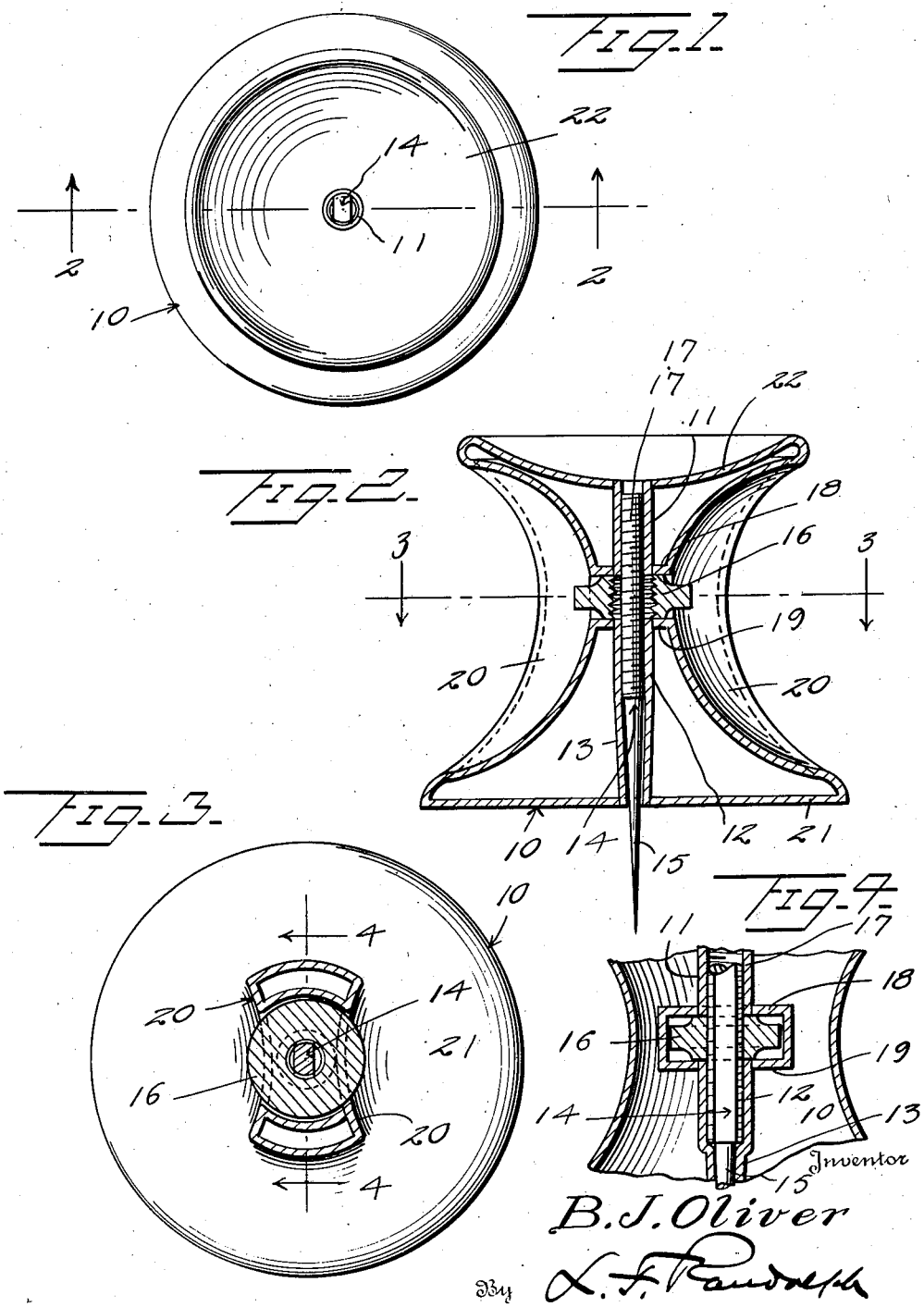

Patented Dec. 7, 1943

2,335,957

UNITED STATES PATENT OFFICE 2,335,957

ADJUSTABLE THUMBTACK OR OTHER FASTENER

Boyce J. Oliver, Jacksonville, Fla.

Application October 21, 1942, Serial No. 462,858

5 Claims. (Cl. 85—16)

This invention relates to a thumbtack or other headed fastener.

It is primarily aimed to provide a construction wherein a piercing shank is adjustable to different extents beyond the head according to the extent of penetration desired and which is also movable in reverse direction in order to retract such shank from an object.

More specifically, it is aimed to provide a head mounting a nut which is operable to slide a penetrating shank or craw relatively to the head, the nut being so located as to be grasped and operated from opposite sides by the thumb and fore finger.

More specific objects and advantages will become apparent from a consideration of the description following taken in connection with accompanying drawing illustrating an operative embodiment.

In said drawing:

Figure 1 is a plan view of the thumb tack or fastener;

Figure 2 is a central vertical sectional view taken on the plane of line 2—2 of Figure 1;

Figure 3 is a horizontal sectional view taken on the plane of line 3—3 of Figure 2 and Figure 4 is a detailed vertical section taken on the plane of line 4—4 of Figure 3.

Referring specifically to the drawing wherein like reference characters designate like or similar parts, the improved thumbtack or other fastener has a head generally designated 10, which head is preferably stamped into shape from any desired plastic material, sheet metal or other suitable material, making a hollow body, although it may be cast or otherwise solid as preferred.

Said head has a central tube consisting of upper and lower portions 11 and 12, respectively, arranged diametrically thereof and with the lower extremity 13 of the portion 12 tapered downwardly and inwardly.

Vertically slidable in the tube 11—12 is a shank generally designated 14 having its lower extremity at 15 tapered and sharpened, whereby it may enter a drawing board, table top, wall or any other material or article. The tapered portion 13 limits the downward projection of the shank 15. The tube portions 11 and 12 as well as the upper portion of the shank 14 are preferably non-circular in cross-section as shown, so that the head and shank will not turn relatively to each other.

A nut 16 is screw threaded to the upper screw threaded portion 17 of the shank 14 and the nut bears against upper and lower walls 18 and 19 of the head 10, so that while the nut 16 may be turned, to advance or retract the shank 14, such nut cannot move longitudinally of the head.

The upstanding central portion of the head 10, from opposite sides is depressed inwardly or concave as at 20 both in horizontal and vertical directions as shown to facilitate engagement of the periphery of the nut 16 between the thumb and fore finger of the same hand of the operator. It will be noted that the periphery of the nut 16 is preferably knurled and that such periphery extends into both the concavities or depressions 20 to facilitate engagement by said thumb and fore finger and manipulation of the nut.

The base of the head, specifically designated 21 is preferably round and relatively large while the upper surface of the head is round but preferably of less diameter than the base and preferably depressed as shown, such upper wall being designated 22.

In using the device, it is manipulated similarly to any ordinary thumbtack or headed fastening. Through the manipulation of the nut, by the thumb and fore finger, the extent of projection of the sharpened point 15 of the shank may be regulated. In addition, in removing the thumbtack from a wall, drawing board, table, desk or the like, the nut 16 may be manipulated in the same direction so as to slide the shank 14 out of engagement therewith.

It is to be understood that the invention is not limited to use as a thumbtack but that its principles may be applied to any fastening having a penetrating shank and a head.

Various changes may be resorted to provided they fall within the spirit and scope of the invention.

I claim as my invention:

1. A fastener of the class described having a head, a penetrating shank carried thereby, a means coacting with the shank and head operable to move the penetrating portion of the shank relatively to the head consisting of a nut journaled on the head and mounted against sliding relatively thereto, said shank having screw threads engaging those of the nut.

2. A fastener of the class described having a head, a penetrating shank carried thereby, a means coacting with the shank and head operable to move the penetrating portion of the shank relatively to the head consisting of a nut journaled on the head and mounted against sliding relatively thereto, said shank having screw threads engaging those of the nut and said head having a tube in which the shank is slidably and non-rotatably mounted.

3. A fastener of the class described having a head, a penetrating shank carried thereby, a means coacting with the shank and head operable to move the penetrating portion of the shank relatively to the head consisting of a nut journaled on the head and mounted against sliding relatively thereto, said shank having screw threads engaging those of the nut and said head having a tube in which the shank is slidably and non-rotatably mounted, said nut extending beyond opposite sides of the adjacent portion of the head to enable engagement and manipulation by and between a thumb and fore finger.

4. A fastener of the class described having a head, a penetrating shank carried thereby, a means coacting with the shank and head operable to move the penetrating portion of the shank relatively to the head consisting of a nut journaled on the head and mounted against sliding relatively thereto, said shank having screw threads engaging those of the nut and said head having a tube in which the shank is slidably and non-rotatably mounted, said tube having a tapered portion, and said shank being tapered at its penetrating end arranged to contact the inner wall of the tapered portion to limit the extent of projection of the shank.

5. A fastener of the class described having a head, a penetrating shank carried thereby, a means coacting with the shank and head operable to move the penetrating portion of the shank relatively to the head consisting of a nut journaled on the head and mounted against sliding relatively thereto, said shank having screw threads engaging those of the nut, and said head having a tube in which the shank is slidably and non-rotatably mounted, said nut extending beyond opposite sides of the adjacent portion of the head to enable engagement and manipulation by and between a thumb and fore finger, the said head from opposite sides having inward depressions into which the periphery of the nut extends to facilitate engagement thereof by and between the thumb and fore finger.

BOYCE J. OLIVER.